United States Patent Office 3,290,071
Patented Dec. 6, 1966

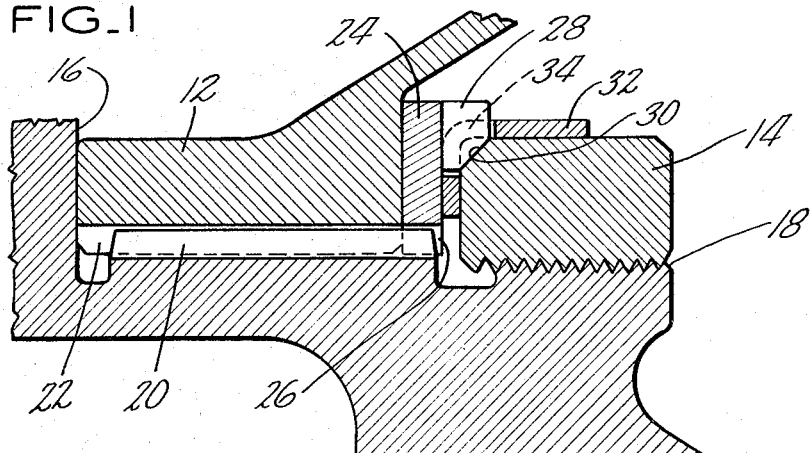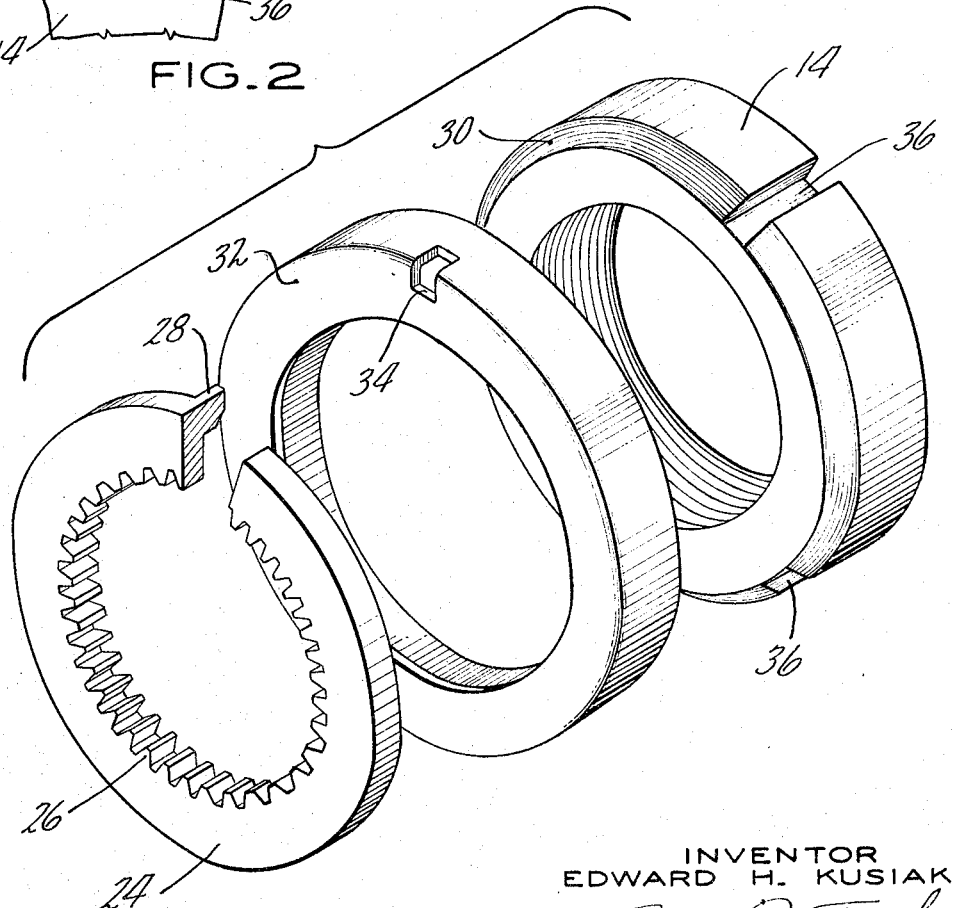

3,290,071
LOCKING DEVICE-SPANNER NUT
Edward H. Kusiak, Longmeadow, Mass., assignor to United Aircraft Corporation, East Hartford, Conn., a corporation of Delaware
Filed Nov. 12, 1964, Ser. No. 410,488
5 Claims. (Cl. 287—53)

This invention relates to an improved thrust nut locking device for securing the spanner nut on a propeller shaft. However, the device of this invention is not limited to propeller shaft nuts but is useful in any situation where it is desired to secure a nut to a shaft with a high degree of reliability.

The device consists essentially of a locking ring which is splined or otherwise secured to the shaft and a locking cup which is clamped between the ring and the nut and is secured to both the ring and the nut in an improved manner so as to prevent rotation of the nut relative to the shaft.

It is, therefore, an object of this invention to provide an improved thrust nut locking device of the character above described.

Another object of this invention is to provide a thrust nut locking device of this type which eliminates bent tangs formerly used on the locking cup to connect the cup and the locking ring.

A further object of this invention is to provide a locking assembly which is capable of inspection to determine whether the device is locked following assembly.

A still further object of this invention is to provide a thrust nut locking device of the type described which has a higher torque capacity as a lock than previously known devices of this sort.

A yet further object of this invention is generally to improve thrust nut locking devices.

Other objects and advantages of the invention will appear or will be pointed out in the following detailed description of the improved device shown in the accompanying drawing.

In the drawing:

FIG. 1 is a cross-sectional elevation of the locking device of this invention showing a thrust nut secured to a propeller shaft;

FIG. 2 is a perspective view of the locking ring, locking cup and thrust nut; and FIG. 3 is a detail illustrating the lock between the cup and the nut.

As herein shown, 10 is a shaft to which a planetary cage 12 is to be secured by a nut 14, the shaft being provided with a shoulder 16 against which the member 12 is urged by the nut. Shaft 10 is also formed with a threaded end portion 18 on which the nut is adapted to be threaded and an inner splined portion 20 of slightly increased diameter which is somewhat longer than member 12. Member 12 is provided with splines 22 which cooperate with the splines on portion 20 to insure rotation of the planetary cage and the shaft as a unit.

After the cage has been slipped onto splined portion 20 of the shaft, a locking ring 24 is likewise slipped onto the protruding splined portion of the shaft in abutting engagement with cage 12, the ring being provided with cooperating splines 26. Ring 24 is formed with a rigid forwardly projecting lug 28 on its periphery which enters into a locking aperture in cup 32. Lug 28, instead of being integral with ring 24, may be in the form of a dowel which is pressed into the ring.

To receive the lug, locking cup 32 is provided in its bottom corner with a locking slot 34. The cup is located on the shaft with its bottom abutting the locking face of ring 24 beneath the overhanging portion 28 of the latter. The bottom corner, herein shown rounded, has the slot 34 located in the adjacent bottom and side walls of the cup at this rounded corner so that, when the cup is centered on the shaft, the lug on the locking ring 24 enters the slot. It will be noted that the right-angled sides of the lug on ring 24 engage the right-angled faces of slot 34 in both the bottom and side walls of the cup so as to lock the cup securely against rotation relative to the locking ring 12 and shaft 10. The ring 24 may be provided with more than one lug. In this case the cup will, of course, be provided with a corner slot for each lug.

Nut 14 is threaded onto the end of the shaft. It will be noted that the external inner end of the nut is slightly chamfered at 30 where it enters the slotted corner of cup 32 so there can be no interference with lug 28 on ring 24 as the inner face of the nut engages the bottom of the cup and forces it against the locking ring. The projecting end of lug 28 also has a chamfer which coincides with the chamfer 30 on nut 14. The nut projects well beyond the open end of the cup and is provided throughout its length with axial grooves 36 to receive a spanner wrench for rotating the nut under proper torque.

It should be noted here that the cup 32 has an axial passage through its bottom wall to receive the shaft which passage is considerably larger in diameter than the diameter of the shaft at the inner end of the threaded portion of the shaft where the bottom of the cup is located. The cup must be centered relative to the shaft in order to insure that lug 28 is in slot 34 and this is accomplished by the cylindrical thrust nut which extends into the cup and fits closely within the cylindrical sidewall of the cup.

The lock between cup 32 and nut 14 is obtained by indenting a short peripheral portion 32a of the lip of the cup into one of the spanner grooves 36, as shown most clearly in FIG. 3. The cup may be indented into more than one spanner groove if desired to obtain the desired security.

The operation of the device will be obvious from the above description. However, some of the advantages will be pointed out which can be expected from the use of the device of this invention. The locking cup can be made by a simple stamping operation and hence is so inexpensive that it can be discarded after use. The locking ring can be used repeatedly. By forming the cup with a continuous periphery, as distinguished from one formed with tangs, a stronger lock is obtained since, once the lip of the cup is indented, it cannot be accidentally removed from the spanner slot and since the depressed portion is still supported by the unbroken rim of the cup (FIG. 3) a very secure lock results.

The present lock between the locking ring and the cup is also advantageous. If the cup is not properly seated relative to the locking ring, with the lug 28 of the latter in the slot 34 of the cup, it is instantly noticeable upon inspection, as the cup will be canted. In some former constructions where tangs were used under somewhat similar circumstances, after the assembly was completed it was impossible to determine upon inspection whether a lock had been effected or not. The tang was not visible and whether the tang had been bent or not had no effect on the assembled structure. In the structure of this invention the locking projection 28 when seated in slot 34 is visible following assembly. Also, of course, while a mechanic might forget to bend a tang, he would not be likely to assemble the present device without seating the lug 28 in the slot 34. Due to the cant of the cup the nut cannot be fully threaded onto the shaft when the cup is not centered with the lug in the slot.

In applications where maximum security is essential the locking device of the present invention finds its greatest appeal. The lock is not only always capable of visible inspection but also it provides a much higher torque capacity than has been known with previous devices using bent tangs due to the location of the slot 34 in the angularly related bottom and side walls of the cup.

While the invention has been shown and described in connection with only one embodiment thereof, it will be understood that many changes may be made in construction and arrangement of the parts without exceeding the scope of the invention as defined in the following claims.

I claim:

1. A locking device for securing a thrust nut to a shaft against rotation relative thereto comprising a locking ring secured to the shaft against rotation and having a rigid lug on one face thereof, a locking cup on the shaft having its bottom abutting said face of said ring and having a locking slot in both the bottom and the side wall of said cup at the corner where they intersect in which said lug is receivable, and a nut threaded onto the end of said shaft and projecting into said cup with the sidewall of said cup closely overlying the external surface of said nut, said nut having an axial groove in its external surface into which a portion of the rim of said cup is adapted to be indented for locking said nut against rotation relative to said shaft.

2. A locking device for securing a nut to a shaft comprising a locking ring secured to said shaft having a rigid axially extending lug on its periphery, a locking cup concentric with said ring having its bottom seated against said ring, said cup having a peripheral slot at the intersection of its bottom and side walls into which said lug extends for locking said cup against rotation relative to said shaft, and a generally cylindrical nut adapted to be threaded onto the end of said shaft having one end disposed within said cup and engageable with the bottom of the latter and having axially extended spanner slots in its outer surface into at least one of which a portion of the rim of said cup is adapted to be indented to lock said nut against rotation relative to said cup, the inner end of said nut which engages the bottom of said cup having a chamfer adjacent the intersection of the bottom and side walls of said cup.

3. A locking device as claimed in claim 2 in which the axial passage through the bottom of the cup which receives the shaft is substantially larger in diameter than the shaft and the nut has a close fit within the sidewall of the cup, whereby the nut centers the cup in position to receive the lug on the ring in the slot of the cup.

4. In combination, a shaft having a shoulder and a splined portion adjacent said shoulder, a member to be secured to said shaft having splines engaging said splined portion, a locking ring abutting said member having splines engaging said splined portion, said ring having a rigid lug projecting laterally from one face thereof, a locking cup on said shaft having its bottom abutting the said face of said locking ring, said cup having a slot in its bottom and side walls at its bottom corner into which said lug projects, a nut threaded on the end of said shaft for axially clamping said cup and said locking ring and said member against the shoulder on said shaft, the end of said nut projecting into the open end of said cup and engaging the bottom of said cup with the sidewall of said cup closely surrounding the inner end of said nut, the inner end of said nut being chamfered adjacent the bottom corner of said cup and the projecting end of said lug having a chamfer which coincides with the chamfer on said nut, and an axially extending groove in the external surface of said nut for receiving a locking indentation formed in the lip of said cup following tightening of said nut.

5. In combination, a shaft having a shoulder, said shaft having a splined portion adjacent said shoulder and a threaded portion of reduced diameter adjacent said splined portion, a member to be secured to said shaft having splines engaging said splined portion, a locking ring having splines engaging said splined portion, said ring having an axially projecting rigid lug, a locking cup having its bottom abutting the lug carrying face of said ring, said cup having a slot into which said lug projects, a nut threaded onto the end of said shaft for clamping said cup, locking ring and member against the shoulder on said shaft, the inner end of said nut projecting into said cup and engaging the bottom thereof with the side wall of said cup closely surrounding the inner end of said nut, and an axial slot in the external surface of said nut for receiving a locking indentation formed in the lip of said cup following tightening of said nut.

References Cited by the Examiner

UNITED STATES PATENTS

| Re. 15,379 | 6/1922 | Bechberger | 151—54 |
| 2,950,944 | 8/1960 | Cooney | 151—53 X |

FOREIGN PATENTS

| 1,037,969 | 5/1953 | France. |

CARL W. TOMLIN, *Primary Examiner.*

A. V. KUNDRAT, *Assistant Examiner.*